Dec. 22, 1936.  H. M. BARBER  2,065,301
DOUBLE PILE FLAT SHEET DELIVERY FOR ROTARY PRINTING PRESSES
Filed April 2, 1936  2 Sheets-Sheet 1
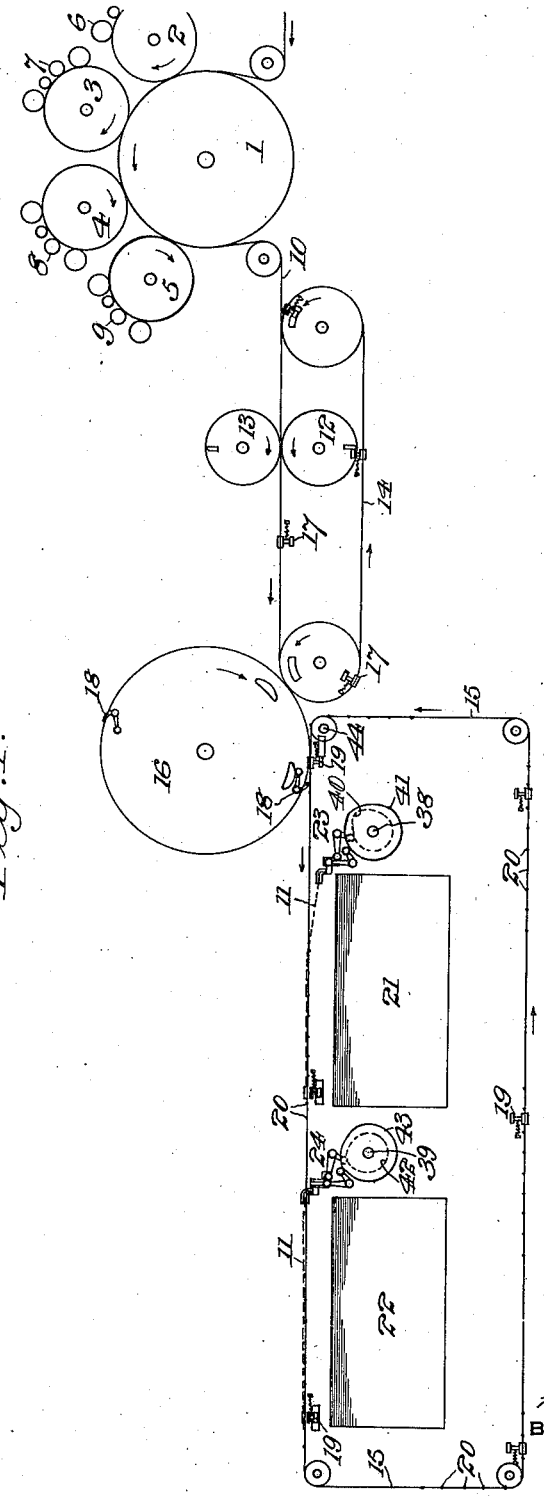
INVENTOR
Howard M. Barber
BY
ATTORNEYS

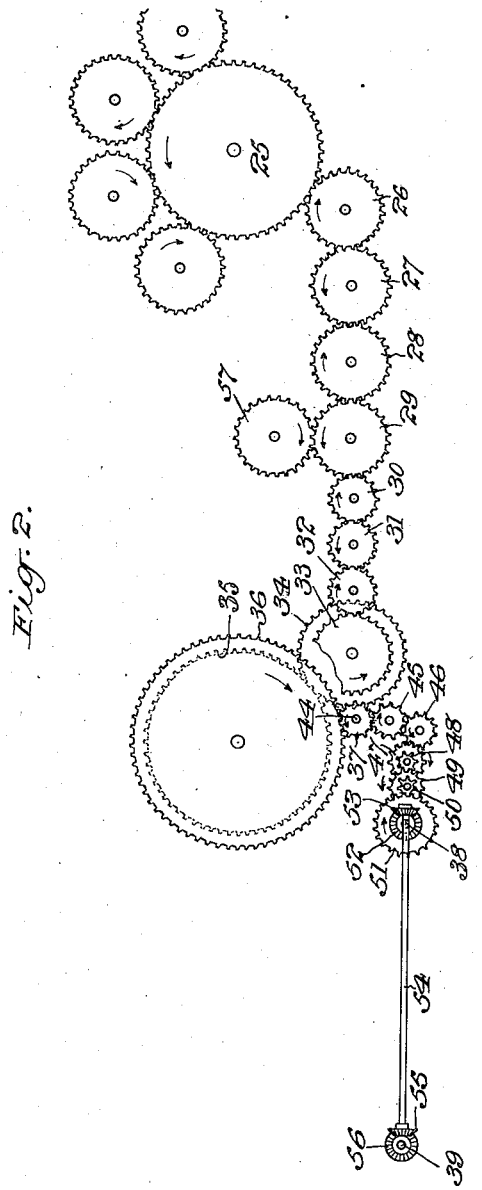

Patented Dec. 22, 1936

2,065,301

UNITED STATES PATENT OFFICE 2,065,301

DOUBLE PILE FLAT SHEET DELIVERY FOR ROTARY PRINTING PRESSES

Howard M. Barber, Pawcatuck, Conn., assignor to C. B. Cottrell & Sons Company, Westerly, R. I., a corporation of Delaware Application April 2, 1936, Serial No. 72,309

10 Claims. (Cl. 271—76)

My invention comprises, generally, a double pile flat sheet delivery having an inner sheet carrier which travels in an endless path, an outer sheet delivery carrier which also travels in an endless path, and a rotary sheet transfer carrier interposed between the inner and outer endless carriers, means being provided for driving the inner carrier at the surface speed of the press and for driving both the interposed rotary carrier and the outer delivery carrier at a somewhat higher surface speed.

A practical embodiment of my invention is represented in the accompanying drawings, in which Fig. 1 represents in diagram a side elevation of so much of a rotary web printing press and its sheet delivery as includes my invention; and Fig. 2 represents a detail side elevation of the gear trains connecting the several carriers with the press and with the inner and outer sets of sheet tail end delivery grippers.

The rotary web printing press is herein shown as arranged to print in four colors on one side of the web, the impression cylinder being denoted by 1, the form cylinders by 2, 3, 4, 5 and their inking mechanisms by 6, 7, 8, 9, respectively.

The web is denoted by 10 and the sheets cut therefrom by 11. The pair of coacting rotary cutters for severing the sheets from the web are denoted by 12, 13.

The inner horizontally disposed sheet carrier 14 travels in an endless path and it is driven at the surface speed of the press.

The outer horizontally disposed sheet carrier 15 also travels in an endless path and it is driven at a surface speed somewhat in excess of the surface speed of the press and of the inner endless sheet carrier.

A rotary sheet transfer carrier 16 is interposed between the outer end of the inner endless sheet carrier 14 and the inner end of the outer sheet delivery endless carrier 15, which rotary sheet transfer carrier is driven at the surface speed of the said outer sheet delivery endless carrier somewhat in excess of the surface speed of the inner endless sheet carrier and the press.

Sets of side grippers 17 on the inner endless sheet carrier 14 serve to advance the web through the coacting rotary cutters 12, 13 to one of the sets of head grippers 18 on the rotary sheet transfer carrier 16, which head grippers 18 in turn transfer the sheets 11 cut from the printed web 10 to one of the sets of side grippers 19 on the outer sheet delivery endless carrier 15. This outer sheet delivery endless carrier is provided at each set of side grippers with a sheet supporting surface 20.

Inner and outer sheet delivery piles 21 and 22 are located within the endless path of the outer sheet delivery carrier 15, thereby permitting the sheet supporting surfaces of the carrier to pass outwardly from the rotary sheet transfer carrier 16 over the said inner and outer delivery piles 21 and 22.

The inner and outer sets of sheet tail end engaging devices, herein shown as tail grippers 23 and 24 are moved bodily and operated to take the sheets from their supporting surfaces 20 of the endless sheet delivery carrier 15 and release the sheets to deposit them on to their respective delivery piles 21 and 22. Any well known or approved means may be employed for moving and operating the tail grippers 22 and 24 to grasp and release their sheets, such, for instance, as the means shown, described and claimed in my copending application filed November 14, 1935, Serial No. 49,683.

The gearing which I have shown for operatively connecting the several carriers with the press and with the inner and outer sets of tail grippers is as follows:

The impression cylinder gear 25 drives the inner endless carrier 14 at the surface speed of the press and also drives the rotary transfer carrier 16 and outer delivery endless carrier 15 at a somewhat higher surface speed, through the train of gears 26 to 37 inclusive.

The inner and outer cross shafts 38 and 39 carry the cams 40, 41 and 42, 43 respectively, which control the bodily movements and the operation of the inner and outer tail grippers 23 and 24, which shafts are driven from the shaft 44 of the gear 37 through the train of gears 45 to 51 inclusive, the bevel gears 52, 53, the shaft 54 and the bevel gears 55, 56.

The gear 57 of the upper rotary cutter 53 is driven from the gear 29 of the first named train of gears.

It will be understood that the sets of grippers on the inner and outer carriers and the interposed rotary carrier are all operated by any well known or approved means to cause the sheets to be advanced and released.

In operation: As the printed web leaves the press it is engaged by successive side grippers 17 on the inner endless carrier 14 and advanced thereby through the coacting rotary cutters 12, 13 which sever the sheets 11 from the web. As the sheets are severed, the head grippers 18 on the rotary transfer carrier 16 grasp successive sheets, speed up their travel and transfer them to successive sets of side grippers 19 on the outer delivery endless carrier 15. These side grippers 19 advance the sheets outwardly over the inner and outer delivery piles 21, 22, the sheets at the same time being supported by successive sheet supporting surfaces 20 of the said endless delivery carrier 15. The grippers 19 may then be open to release the leading ends of their respective sheets as the sheets reach positions over the inner and outer delivery piles 21 and 22 respectively, and the tail ends of the said sheets are taken by the tail grippers 23 and 24 respectively and deposited on to the said delivery piles.

While I have described a certain arrangement of gearing for connecting the several operating parts, it will be understood that any other suitable gear mechanism may be used for this purpose.

It is also evident that various changes may be resorted to in the construction, form and arrangement of the several parts without departing from the spirit and scope of my invention, and hence I do not intend to be limited to the particular embodiment herein shown and described, but what I claim is:

1. In a double pile flat sheet delivery for printing presses, an inner carrier traveling in an endless path, an outer delivery carrier also traveling in an endless path, an interposed rotary transfer carrier, means for driving the inner carrier at the surface speed of the press and the other carriers at a higher surface speed, inner and outer delivery piles, and means for taking the sheets from the outer delivery carrier and depositing them on to their respective piles.

2. In a double pile flat sheet delivery for printing presses, an inner carrier traveling in an endless path, an outer delivery carrier also traveling in an endless path, an interposed rotary transfer carrier, means for driving the inner carrier at the surface speed of the press and the other carriers at a higher surface speed, inner and outer delivery piles located within the path of the outer delivery carrier, and means for taking the sheets from the outer delivery carrier and depositing them on to their respective piles.

3. In a double pile flat sheet delivery for printing presses, an inner carrier traveling in an endless path, an outer delivery carrier also traveling in an endless path, an interposed rotary transfer carrier, means for driving the inner carrier at the surface speed of the press and the other carriers at a higher surface speed, inner and outer delivery piles, and inner and outer sets of grippers for taking the sheets from the outer delivery carrier and depositing them on to their respective piles.

4. In a double pile flat sheet delivery for printing presses, an inner carrier traveling in an endless path, an outer delivery carrier also traveling in an endless path, an interposed rotary transfer carrier, means for driving the inner carrier at the surface speed of the press and the other carriers at a higher surface speed, inner and outer delivery piles located within the path of the outer delivery carrier, and inner and outer sets of grippers for taking the sheets from the outer delivery carrier and depositing them on to their respective piles.

5. In a double pile flat sheet delivery for printing presses, an inner carrier traveling in an endless path, an outer delivery carrier also traveling in an endless path, an interposed rotary transfer carrier, means for driving the inner carrier at the surface speed of the press and the other carriers at a higher surface speed, inner and outer delivery piles, and inner and outer sets of tail grippers for taking the sheets from the outer delivery carrier and depositing them on to their respective piles.

6. In a double pile flat sheet delivery for printing presses, an inner carrier traveling in an endless path, an outer delivery carrier also traveling in an endless path, an interposed rotary transfer carrier, means for driving the inner carrier at the surface speed of the press and the other carriers at a higher surface speed, inner and outer delivery piles located within the path of the outer delivery carrier, and inner and outer sets of tail grippers for taking the sheets from the outer delivery carrier and depositing them on to their respective piles.

7. In a double pile flat sheet delivery for printing presses, an inner carrier traveling in an endless path, an outer delivery carrier also traveling in an endless path, an interposed rotary transfer carrier, means for driving the inner carrier at the surface speed of the press and the other carriers at a higher surface speed, said inner and outer carriers having side grippers and said rotary carrier having head grippers for taking the sheets from the inner carrier grippers, speeding up the sheets and transferring them to the outer carrier grippers, inner and outer delivery piles, and means for taking the sheets from the outer delivery carrier and depositing them on to their respective piles.

8. In a double pile flat sheet delivery for printing presses, an inner carrier traveling in an endless path, an outer delivery carrier also traveling in an endless path, an interposed rotary transfer carrier, means for driving the inner carrier at the surface speed of the press and the other carriers at a higher surface speed, said inner and outer carriers having side grippers and said rotary carrier having head grippers for taking the sheets from the inner carrier grippers, speeding up the sheets and transferring them to the outer carrier grippers, inner and outer delivery piles located within the path of the outer delivery carrier, and means for taking the sheets from the outer delivery carrier and depositing them on to their respective piles.

9. In a double pile flat sheet delivery for printing presses, an inner carrier traveling in an endless path, an outer delivery carrier also traveling in an endless path, an interposed rotary transfer carrier, means for driving the inner carrier at the surface speed of the press and the other carriers at a higher surface speed, said carriers having spaced sheet engaging devices and said outer delivery carrier having spaced sheet supporting surfaces in connection with its sheet engaging devices, inner and outer delivery piles, and means for taking the sheets from the outer delivery carrier and depositing them on to their respective piles.

10. In a double pile flat sheet delivery for printing presses, an inner carrier traveling in an endless path, an outer delivery carrier also traveling in an endless path, an interposed rotary transfer carrier, means for driving the inner carrier at the surface speed of the press and the other carriers at a higher surface speed, said carriers having spaced sheet engaging devices and said outer delivery carrier having spaced sheet supporting surfaces in connection with its sheet engaging devices, inner and outer delivery piles located within the path of the outer delivery carrier, and means for taking the sheets from the outer delivery carrier and depositing them on to their respective piles.

HOWARD M. BARBER.